United States Patent

[11] 3,603,686

[72] Inventors T. O. Paine
Administrator of the National Aeronautics and Space Administration with respect to an invention of;
Charles L. Wyman; John M. Gould, Huntsville, Ala. 35802; Robert E. Johnson, Williamville, N.Y. 14221; Paul F. Weiss, Sudbury, Mass. 01776
[21] Appl. No. 830,366
[22] Filed June 4, 1969
[45] Patented Sept. 7, 1971

[54] ACQUISITION AND TRACKING SYSTEM FOR OPTICAL RADAR
8 Claims, 4 Drawing Figs.
[52] U.S. Cl. ................................................ 356/152,
250/203 X, 178/6, 178/DIG. 21
[51] Int. Cl. ...................................................... G01b 11/26
[50] Field of Search ........................................ 356/1, 141,
152; 343/6; 250/203, 199; 178/6

[56] References Cited
UNITED STATES PATENTS
3,504,182 3/1970 Pizzurro et al. ............... 356/141
3,514,608 5/1970 Whetter ....................... 356/4
3,240,942 3/1966 Birnbaum et al. ............ 178/6

OTHER REFERENCES
"Geodolite" Laser Dist. Meas. Instr., Model 3, Spectra-Physics, 3-1968

Primary Examiner—Rodney D. Bennett, Jr.
Assistant Examiner—S. G. Buczinski
Attorneys—L. D. Wofford, Jr., A. H. Tischer and G. T. McCoy ABSTRACT: A laser-based tracking system is disclosed having the capability of automatically preforming an acquisition search to locate a target. In the acquisition mode, a laser beam and the instantaneous field of view of an image dissector photomultiplier are electronically and coaxially scanned over the same acquisition field. Upon acquisition of the target, the image dissector's instantaneous field of view is scanned across the target in a cross-scan pattern. The error signal is fed back to the center the laser beam and the cross-scan pattern on the target. If acquisition of the target is lost for a predetermined time the system returns to the acquisition mode to scan both the laser beam and instantaneous field of view of the image dissector over the acquisition field of view.

CHARLES L. WYMAN
JOHN M. GOULD
ROBERT E. JOHNSON
PAUL E. WEISS
INVENTORS 3,603,686

ACQUISITION AND TRACKING SYSTEM FOR OPTICAL RADAR

ORIGIN OF THE INVENTION

The invention described herein was made in the performance of work under a NASA Contract and is subject to the provisions of Section 305 of the National Aeronautics and Space Act of 1958, Public Law 85–568 (72 Stat. 435; 42 USC 2457).

BACKGROUND OF THE INVENTION

This invention relates to an acquisition and tracking system. More particularly, this invention relates to an acquisition and tracking system for optical radar.

There are many advantages to an optical radar system utilizing narrow beam radiation patterns. For example, energy is concentrated in a specific direction thereby minimizing power requirements. Any light source capable of being concentrated into a well-collimated beam and modulated can be used in this optical radar system. For example, an intense light source such as a continuous wave laser is especially suitable. However, the use of a narrow beam of radiation poses difficult problems in acquisition and tracking between transmitter and receiver. Establishment of contact or acquisition requires a search both in azimuth and in elevation and the system must operate in the instantaneous field of view defined by the divergence of the transmitted beam.

SUMMARY OF THE INVENTION

The following discussion will be directed to an acquisition and tracking system for an optical radar system wherein the light beam may be modulated for range information. The system includes a reflex unit which comprises transmitting optics for transmitting the beam coaxially to a receiver telescope.

Acquisition, i.e., contact between the transmitter and the receiver is accomplished by raster scanning the beam and the receiver instantaneous field of views over a predetermined acquisition field. If the target is within this acquisition field, the beam is reflected and is detected when the target comes within the instantaneous field of view. The transmitter portion of the present invention includes a beam steerer while the receiver includes an image dissector, both of which are slaved together so as to view the same instantaneous field of view during the acquisition cycle.

To maintain acquisition of the target, i.e., to track the target after initial acquisition, the image dissector is scanned in a cross-scan pattern to obtain a differential error signal indicating the offset of the target from the center of the cross-scan pattern. The differential error signal is fed back to force the cross-scan pattern to center itself on the target. The instantaneous field of view of the transmitter is slaved to the center of the cross-scan pattern so that as the target moves about in the acquisition field, the light continues to illuminate it.

When the system is tracking a moving target, the reflex unit is placed on a tracking pedestal so as to allow the direction of the total acquisition field of view to be controlled by a suitable servo loop.

Accordingly it is an object of the present invention to provide an acquisition and tracking system for use in optical radar.

DESCRIPTION OF THE DRAWINGS

Other objects and advantages will be apparent from the specifications and claims and from the accompanying drawing in which.

DESCRIPTION OF PREFERRED EMBODIMENT

Figure 1:
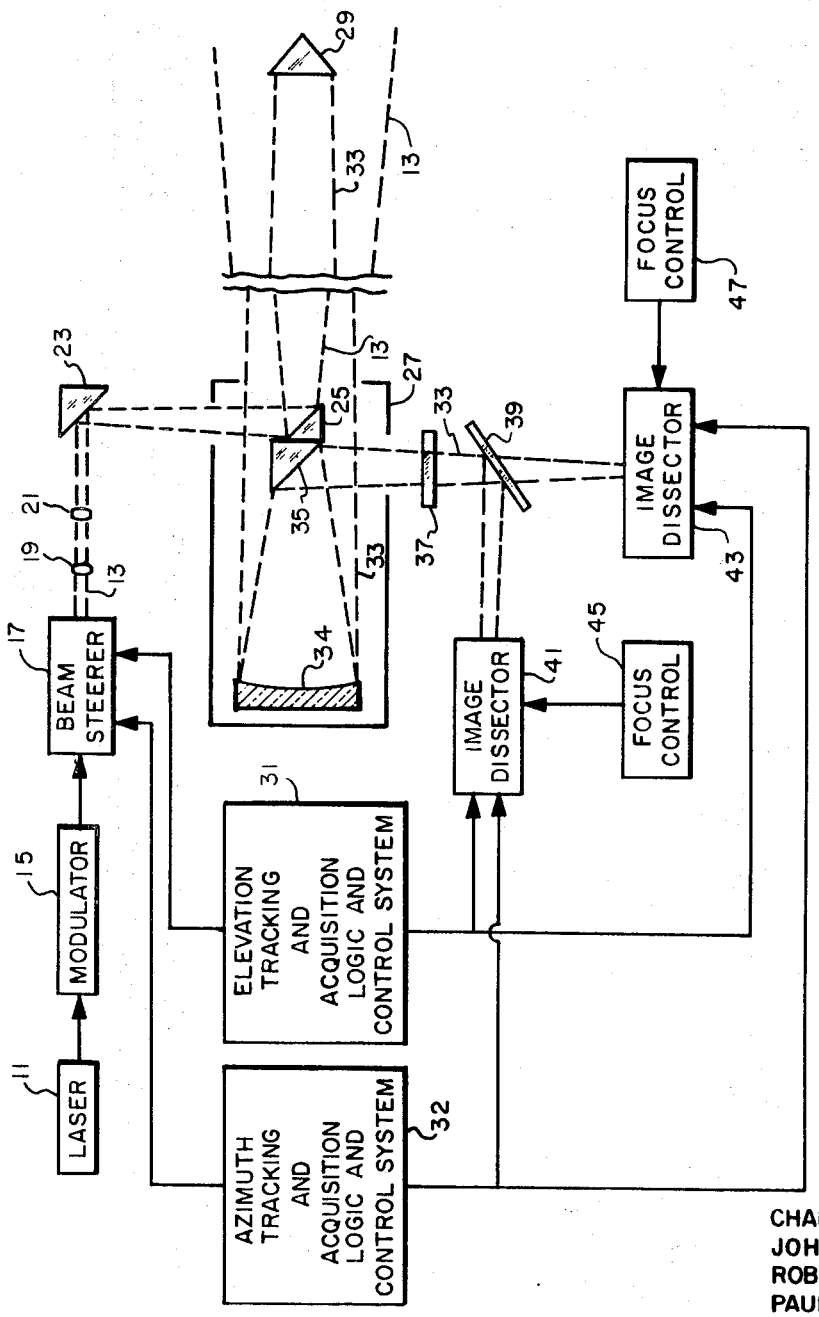
FIG. 1 is a schematic representation of an acquisition and tracking system embodying the present invention.

Referring now to FIG. 1 there is shown a light source, such as a laser 11, for producing a beam of light 13 that is projected through a modulator 15, a beam steerer 17 and then through lenses 19 and 21 to mirror 23. The beam 13 is reflected by mirror 25 which directs the beam along the mechanical axis of a receiver telescope 27. The function of the laser is to illuminate or "lightup" a corner cube reflector 29. The corner cube reflector or target is adapted to be disposed on the object wished to be tracked and reflects light parallel or in a retrodirection to received light.

The modulator 15 may be of any type suitable for modulating the laser output at an identification frequency. The beam steerer 17 may be of the type described by V. Fowler and J. Schlafer in APplied Optics 5, 1975 (1966) and is utilized to obtain scanning of the laser beam across a predetermined acquisition field in accordance with signals supplied by tracking and acquisition logic and control systems 31 and 32; system 31 controlling the elevation of beam 13 and system 32 controlling the azimuth of beam 13. The lenses 19 and 21 are utilized to control the beam width of the laser beam 13.

Figure 2:
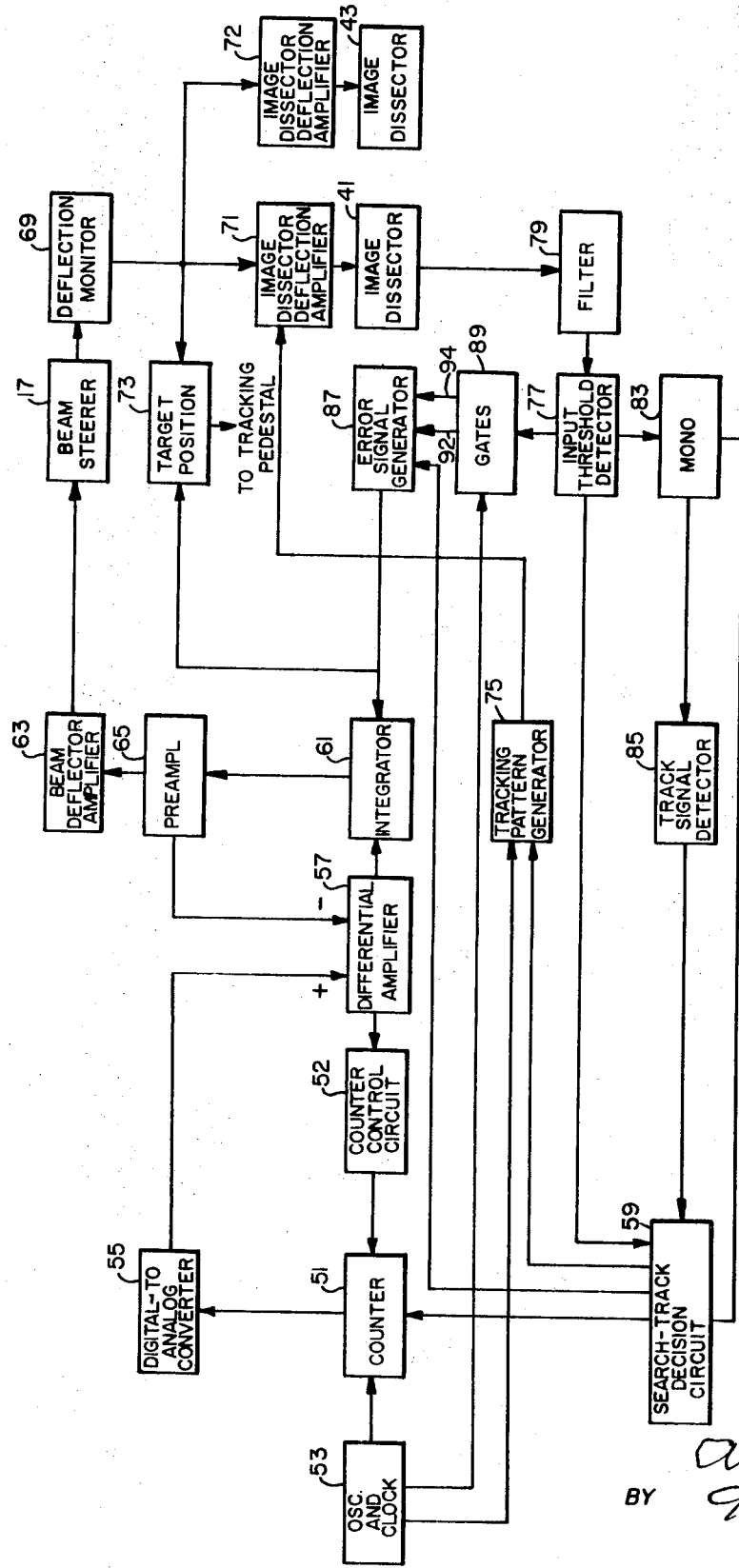
FIG. 2 is a block diagram of the logic and control circuit of FIG. 1.

The receiving telescope 27 includes a parabolic mirror 34 for directing light received on the same axis as the transmitted beam 13, including reflected beam 33 reflected from corner cube 29, to a mirror 35, thence through an interference filter 37 to reduce extraneous light and thence to a beam splitter 39. The beam splitter directs a portion of the beam 33 to the input of image dissectors 41 and 43. Image dissectors 41 and 43 are photomultipliers having an imaging section and can scan a small instantaneous field of view in two dimensions. Focus circuits 45 and 47 are respectively connected to the focus coils (not shown) of the image dissectors to control the size of the instantaneous field of view. Signals applied to leads from the tracking and acquisition control circuits 31 and 32 respectively control the elevation and azimuth of the instantaneous field of view of the image dissectors 41 and 43. FIG. 2 shows a block diagram of the elevation tracking and acquisition logic and control system 31. System 32 is identical to system 31 except as hereinafter noted and only system 31 will be described in detail.

Referring now to FIG. 2, the elevation tracking and acquisition logic and control system has a counter 51 for providing the acquisition scan pattern control of the elevation dimension. The counter is driven by clock source 53 and has its output connected to a digital to analog converter 55 which in turn provides a first input to a differential amplifier 57. The counter 51 is started during the acquisition cycle by the output from a search-track decision and switching logic circuit 59 and is controlled during the tracking cycle by the output of the differential amplifier 57.

The output of the differential amplifier 57 is connected to the input of integrator 61. The output of integrator is connected to a beam deflector amplifier 63 via preamplifier 65. The output of preamplifier is also fed back to form the second input to differential amplifier 57 so as to slave the output of the integrator to the output of the digital to analog converter 55. The beam steerer 17 is connected to the output of amplifier 63 and deflection monitor 69 is coupled to the output of the beam steerer. The output of the deflection monitor provides the input to image dissector deflection amplifier 71 so as to slave elevation scan of the instantaneous field of view of image dissector 41 to the elevation of the transmitted beam 13. Additionally the output of the deflection monitor 69 is connected to the target position circuit 73 which controls a tracking pedestal (not shown) that determines the mechanical axis of the telescope 27 of FIG. 1. A tracking pattern generator 75 driven by clock 53 has its output connected to a second input of image dissector deflection amplifier 71 and functions to provide the image dissector 41 with a cross-scan pattern when the system is in the tracking cycle. The output of the image dissector 41 is connected to an input threshold deflector 77 via a narrow crystal filter 79. The range image dissector 43 has its input connected to image dissector deflection amplifier 72 which in turn is energized by the output of deflection monitor 69.

The output of the threshold detector 77 is fed to a monostable multivibrator 83 thence to a track signal detector 85 and then to the search-track decision and switching circuit 59 which controls the tracking pattern generator. The output of the threshold detector is also applied to an error signal generator 87 via gating circuit 89 having an up gate output 92 and a down gate output 94. The error signal generator produces an output or differential error signal representing the offset of the corner cube 29 from the center of the cross-scan pattern. This error signal is fed back to the integrator 61 and to target position circuit 73.

In operation, the beam width of the laser beam 13 (FIG. 1) and the instantaneous field of view of the image dissectors 41 and 43 are made equal by adjustment of lenses 19 and 21 and focus control circuits 45 and 47. In the absence of a signal from the track signal detector 85 (FIG. 2) indicating that the corner cube 29 is being tracked, the search-track decision circuit 59 initiates the acquisition cycle by starting counter 51. Counter 51, which produces an output pulse after a predetermined number of clock pulses have been received from clock 53, has its output converted to an analog signal by digital to analog converter 55 to provide a control signal for the elevation dimension of the beam 13 and the instantaneous field of view of the image dissector 41. As previously stated it will be understood that a second control circuit 32 is provided to control the azimuth dimension of the beam 13 and the instantaneous field of view of the image dissector 41.

In the now preferred embodiment, the method of scanning during the acquisition cycle is a step scan raster pattern over a predetermined acquisition field. This may be accomplished by providing a digital staircase waveform, in the case of the elevation dimension, as the control signal applied to the elevation beam deflector amplifier 63 and the elevation image dissector deflections amplifier 71 and by providing a triangular wave form, in the case of the azimuth dimension, as the control signal applied to the azimuth beam deflector amplifier and the azimuth image dissector deflection amplifier.

In a manner to be more further described hereinafter the integrator 61 is a common component to both the acquisition and tracking cycles of the system and accepts signals from the differential amplifier 57 during the acquisition cycle and from the error signal generator 87 when the system is tracking. So that the integrator 61 output follows the digital to analog converter 55 output during the acquisition cycle, the output of converter 55 is compared with the integrator 61 output (via preamplifier 65) in the differential amplifier 57 to slave the integrator 61 to the converter 55. The deflection monitor 69 samples the input to the beam steerer 17 to provide the means for providing a signal indicative of the elevation of beam 13 and also transfers the output of the integrator 61 to the image dissector deflection amplifier 71 so that the laser beam 13 and the field of view of the image dissector 41 are scanned in the same way during the acquisition cycle and thus are always pointed on the same axis.

When the laser beam 13 (FIG. 1) and the instantaneous field of view of the image dissector 41 scan across the corner cube reflector 29, the image dissector 41 will receive reflected beam 33. The image dissector 41 in the well-known manner converts the received light beams into an electrical signal. The output of the image dissector is filtered by filter 79 (FIG. 2) so that only light modulated at a predetermined identification frequency will be tracked and the output of filter 79 is applied to the input of threshold detector 77, which squares signals above a predetermined threshold and provides a control signal to the input of gating circuit 89 and monostable multivibrator 83. Additionally during the acquisition cycle the output signal of the threshold detector 77 is applied directly to the search-track decision circuit 59 to initiate a first command signal causing counter 51 to stop and to provide a second command signal to start tracking pattern generator 75.

The energization of the tracking pattern generator causes a signal to be applied to the image dissector deflection amplifier 71 so as to cause the instantaneous field of view of the image dissector 41, but not beam 13, to scan up and down one beam position in elevation. A similar occurrence also occurs in the tracking and acquisition logic and control system 32 that controls the azimuth of the instantaneous field of view of the image dissector. That is, after detection of the reflected beam 33 the azimuth tracking and control system 32 (FIG. 1) causes the instantaneous field of view of the image dissector to scan back and forth one beam position thereby causing the total instantaneous field of view of the image dissector 51 to be scanned in a cross-scan pattern. Such scanning causes the instantaneous field of view of the image dissector 41 to move across the target or corner cube 29 thereby chopping the output signal of the image dissector 41 and the input threshold detector 71 output signal. The chopped output signal of the threshold detector 77 is gated by gating circuit 77 so as to produce an up gate output on lead 92 and a down gate output on lead 94 that are combined in the error signal generator 87.

Figure 3:
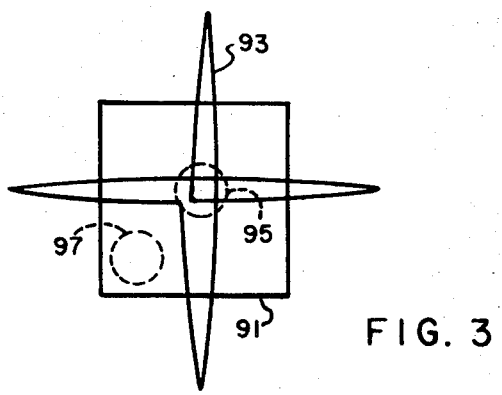
FIG. 3 is representation of the cross-scan pattern used in the tracking cycle of FIG. 1 to generate a differential error signal.
Figure 4:
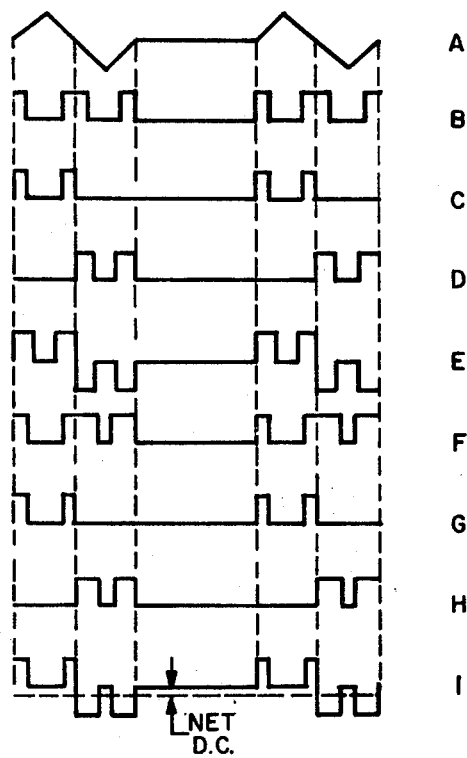
FIG. 4 are waveforms useful in understanding the generation of the differential error signal.

This will be more clearly understood by reference to FIGS. 3 and 4. FIG. 3 is a representation of the cross-scan pattern of the instantaneous field of view of image dissector 41 during the tracking cycle. The size of the instantaneous field of view or one-beam position is represented by square 91 and the method of scanning may be seen by following the path of the star-shaped line 93. Two possible positions of the reflected beam 33 within the instantaneous field of view are shown by circles 95 and 97. FIG. 4 discloses various waveforms used in generating the cross-scan pattern and in generating the differential error signal used in centering the reflected beam in the cross-scan pattern.

Referring now to waveform A of FIG. 4 there is shown the output signal of the tracking pattern generator 75 of FIG. 2 that is applied to the image dissector amplifier 71 to cause the instantaneous field of view of the image dissector 41 to move up and down. Waveform B shows the chopped output of the threshold detector 77 of FIG. 2 when the reflected beam 33 is centered as at 95 in FIG. 3, while waveform F shows the chopped output of the threshold detector 77 when the reflected beam 33 is displaced downward as at 97 in FIG. 3.

Waveforms C and D represent the up gate and down gate output of gating circuit 89 of FIG. 2 that form the input to the error signal generator 87 when the target is centered. The down gate output signal is inverted by the error signal generator 87 and added to the up gate output signal to form error signal (waveform E) that is applied to integrator 61. It will be apparent that since the average DC signal of the differential error signal is zero the output of the integrator 61 will not be altered. Accordingly the elevation of beam 13 and the center of the instantaneous field of view of the image dissector 41 will remain the same.

Referring now to waveforms G and H of FIG. 4 there is shown the up and down gate output signals when the target is displaced downward as at 97 in FIG. 3. In this instance the up and down gate output signal are not equal and an average or net DC error signal (waveform I) is applied to integrator 61. The output of the integrator accordingly will be altered in a direction tending to center the target or reflected beam 33 in the center of cross-scan pattern of image dissector 41 and in the center of the laser beam 13.

The output of the error signal generator 87 is also applied to the target position circuit 73 that sums the error signal with the output of deflection monitor 69 to obtain an output signal indicative of angular separation of the target or corner cube reflector 29 from the axis of telescope 27. It will be understood that if the present invention is used in tracking a target which moves outside of the original acquisition field of view, the output of the target position circuit 73 may control a tracking pedestal so as to alter the acquisition field of view.

While the system is in the track mode and the integrator 61 output follows the motion of the corner cube reflector 29, it is also necessary to have the counter 51 follow these motions. This will insure that if acquisition is lost and the system must reacquire, scanning will begin from the same point where it had been tracking. In the now preferred embodiment the polarity of the differential amplifier 57 is sensed by counter control circuit 52 to produce a control signal to set the direction of the counter 51.

To enable the system to return to the acquisition cycle, i.e., if tracking of the target is interrupted, the chopped output of the threshold detector 77 is applied to fire monostable multivibrator 83. The track signal detector may comprise a threshold detector that detects the output pulses of multivibrator 83, to maintain the search track decision circuit 59 in the track mode and in the absence of such pulses returns the circuit 59 to the acquisition mode after a predetermined time.

While a particular embodiment of the present invention has been shown and described, it will be obvious to those skilled in the art that changes and modifications may be made without departing from the invention.

What is claimed is:

1. In a target acquisition and tracking system having a laser source for transmitting a laser beam, a modulator for modulating said transmitted laser beam at a predetermined frequency, and a beam steerer for scanning said modulated beam in search of a target, the improvement comprising:
   a target adapted to reflect said laser beam received thereon in a retrodirection,
   a telescope means having optic means associated therewith for directing said transmitted laser beam from said beam steerer along the mechanical axis of said telescope means,
   said beam steerer adapted to direct said laser beam over a predetermined acquisition field in search of said target,
   said telescope means having optics for receiving said reflected laser beam from said target,
   a first image dissector associated with said telescope means,
   said telescope means having additional optic means adapted to direct said reflected laser beam toward the imaging section of said first image dissector,
   said first image dissector having a total field of view corresponding to said acquisition field of view, and an instantaneous field of view of about the size of the transmitted laser beam,
   a control system having an acquisition means for generating a first control signal for causing said first image dissector to raster scan its instantaneous field of view over its total field of view in search of the received reflected laser beam, and a second control signal to cause said beam steerer to direct said transmitted laser beam in a raster scan of said acquisition field of view in search for said target, both signals being slaved together so the total field of view of the first image dissector and said acquisition field of view are scanned coaxially in a corresponding manner,
   said first image dissector producing a tracking signal when the received reflected laser beam is detected within the total field of view,
   said control system having a tracking control means responsive to said tracking signal of said image dissector for causing said first image dissector to stop raster scanning and to start scanning its instantaneous field of view in a cross-scan pattern,
   said control system generating error signals representing the offset of the received reflected laser beam, and thus the target, from the center of said cross-scan pattern of said first image dissector,
   said control means being responsive to said error signals so as to cause said first image dissector to center said cross-scan pattern on said reflected laser beam regardless where it is in said total field of view, and
   said control means being responsive to said error signals to also cause said beam steerer to center said transmitted laser beam on said target.

2. A target acquisition and tracking system defined by claim 1 wherein:
   said control means has a track signal detector means responsive to a predetermined time duration interruption of said tracking signal for stopping the cross-scan of said instantaneous field of view of said first image dissector and starting an acquisition raster scan of said instantaneous field of view of said first image dissector and said transmitted laser beam.

3. A target acquisition and tracking system defined by claim 1 including:
   means for positioning said telescope means so as to being said target within an acquisition field of view of said transmitted laser beam, and
   said control means in response to said error signals causing said means for positioning said telescope means to tend to center said reflected laser beam in the total field of view of said image dissector and thus to center the target in the center of said acquisition field of view.

4. A target acquisition and tracking system according to claim 1 including:
   a filter for the electrical output of said image dissector so that only a laser light modulated at a predetermined frequency will be tracked.

5. A target acquisition and tracking system according to claim 1 wherein:
   said cross-scan pattern of said first image dissector is up and down one instantaneous field of view position in elevation, and back and forth one instantaneous field of view in azimuth.

6. A target acquisition and tracking system according to claim 1 wherein:
   said telescope means optics for receiving said reflected laser beam is a rear parabolic mirror adapted to receive said reflected laser beam from said target and direct it forward along the mechanical axis of said telescope toward said additional optic means.

7. A target acquisition and tracking system according to claim 1, including:
   a second image dissector associated with said telescope means, and
   said additional optic means of said telescope means having a beam splitter for directing a portion of the reflected laser beam toward the imaging section of beam, second image dissector.

8. A target acquisition and tracking system according to claim 1 wherein said control system includes:
   first control circuits for controlling the elevation of the instantaneous field of view of said first image dissector and the elevation of said transmitted laser beam, and
   second control circuits for controlling the azimuth of the instantaneous field of view of said first image dissector and the azimuth of said transmitted laser beam.